W. CLEMOW, C. L. HEID & A. W. SPEICHER.
TOOTH EXTRACTOR.
APPLICATION FILED SEPT. 15, 1910.
1,010,862.
Patented Dec. 5, 1911.
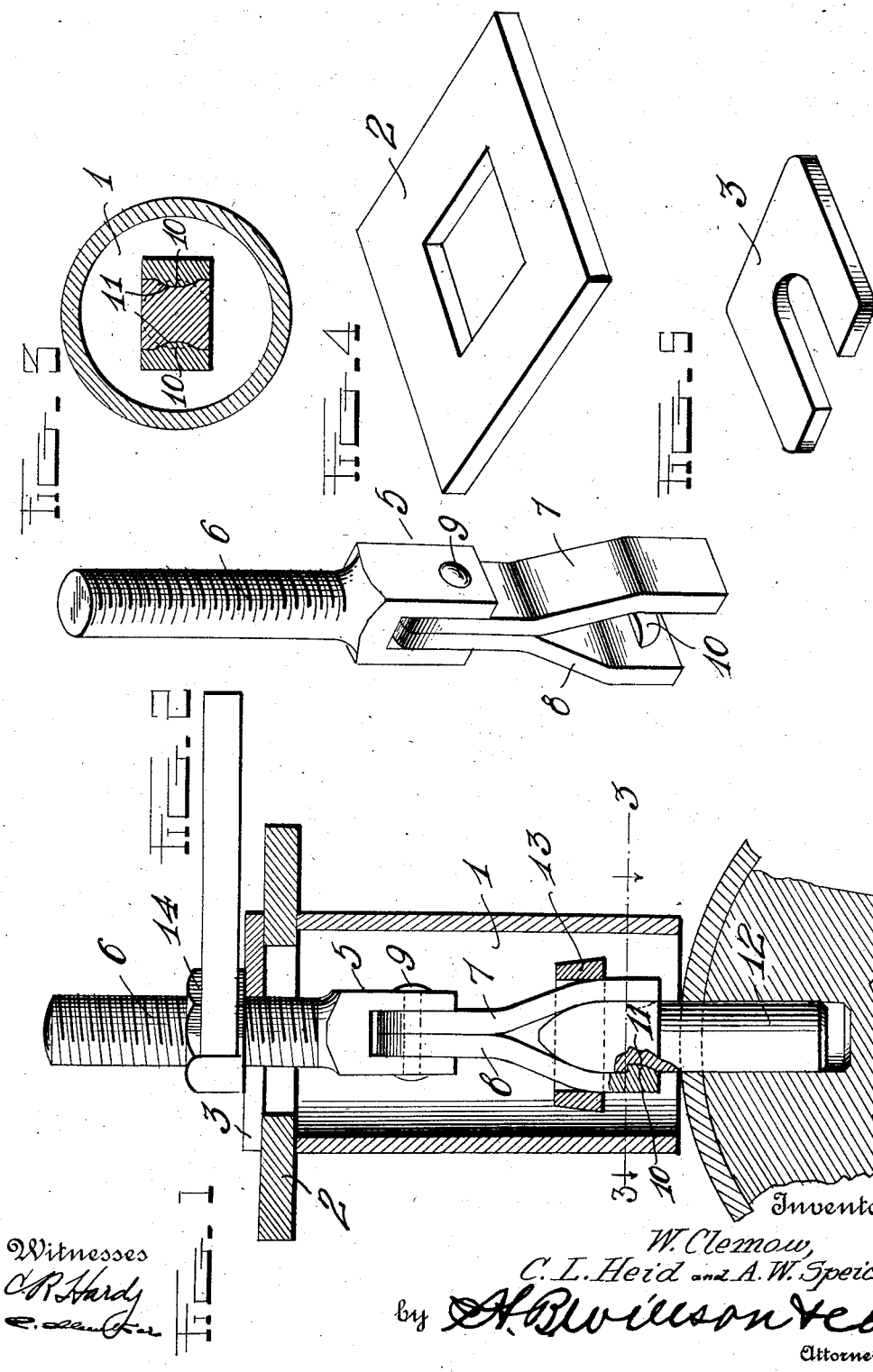
Witnesses
C. R. Hardy
Inventors
W. Clemow,
C. L. Heid and A. W. Speicher
by H. B. Willson & Co.
Attorneys

UNITED STATES PATENT OFFICE.

WILLIAM CLEMOW, CHARLES L. HEID, AND ALFRED W. SPEICHER, OF CARBONDALE, PENNSYLVANIA.

TOOTH-EXTRACTOR.

1,010,862.  Specification of Letters Patent.  Patented Dec. 5, 1911.

Application filed September 15, 1910. Serial No. 582,249.

*To all whom it may concern:*

Be it known that we, WILLIAM CLEMOW, CHARLES L. HEID, and ALFRED W. SPEICHER, citizens of the United States, residing at Carbondale, in the county of Lackawanna and State of Pennsylvania, have invented certain new and useful Improvements in Tooth-Extractors; and we do declare the following to be a full, clear, and exact description of the invention, such as will enable others skilled in the art to which it appertains to make and use the same.

This invention relates to an improved device for extracting teeth from crushing rolls.

The object of the invention is to provide a simply constructed efficient device of this class which may be readily applied and quickly operated.

With the foregoing and other objects in view, the invention consists of certain novel features of construction, combination and arrangement of parts as will be more fully described and particularly pointed out in the appended claim.

In the accompanying drawings, Figure 1 represents a side elevation partly in section of this improved device applied; Fig. 2 is a perspective view of the gripping member detached; Fig. 3 is a transverse section taken on the line 3—3 of Fig. 1; Fig. 4 is a perspective view of the guide plate detached; Fig. 5 is a similar view of the washer.

In the embodiment illustrated a tubular bearing member 1 is shown which may be of any desired shape in cross section and of any desired length. This member is designed to encircle the gripping member 5 to be described and one end thereof is adapted to engage the roll from which the tooth is to be extracted. A suitable guide plate 2 and a washer 3 are arranged on the other end of said tubular member for holding the gripping member in operative position and for affording a bearing surface for the operating member hereinafter described.

The gripper 5 is preferably constructed of a threaded shank 6 having one end bifurcated to receive one end of the gripping members 7 and 8. The arms of this bifurcated end are apertured to receive a bolt 9 which passes through one end of the shanks of the gripping members 7 and 8 and supports them in pivotal engagement with said shank. These members 7 and 8 are constructed of flat metal bars and the shanks thereof contact throughout a portion of their length when in operative position. These members 7 and 8 are preferably constructed with their free ends flared outwardly or diverging and curved to form tooth engaging gripping jaws. The members 7 and 8 are free to swing laterally and are provided on their inner faces with laterally projecting lugs or teeth, as 10, which are designed to engage undercut recesses, as 11, formed in the opposite faces of the teeth 12. The construction of the gripping members of flat bars with their shanks contacting provides strong strain withstanding extractors.

A clamping ring 13 is adapted to slide over the free ends of the jaws 7 and 8 and force them into close engagement with the teeth 12 thereby securing and holding said jaws in operative position. An operating member 14 is provided with a screw threaded bore for engagement with the threaded shank 6 and is operable thereon to force said shank and the gripping jaws connected therewith outwardly, whereby an enormous pulling action is exerted on the tooth to be extracted and it is thus forced out of its socket. This operating member is here shown in the form of a nut adapted to be turned on the shank by a wrench, but it may be provided with a handle if desired, thereby obviating the necessity of using the wrench.

In the use of this invention the jaws 7 and 8 are first swung into engagement with the recessed sides of the tooth to be extracted and the clamping ring is then forced downwardly thereover to lock said jaws into engagement with the tooth. The tubular bearing member 1 is then placed over the gripper with one end in engagement with the surface of the roll as shown in Fig. 1 and the guide plate 2 having the large opening therein is slipped over the outer end of the shank 6 to close the outer end of the tube 1. The washer 3 which has an opening through one edge thereof is placed around the shank 6 in close engagement therewith and it is designed to form a support for the operating member 14 which on the continued screwing up thereof on the shank 6 forces said shank and gripping jaws connected therewith outwardly carrying with them the tooth to be extracted.

Among the special advantages attending the particular construction of the various component parts of our invention are the following, to wit: When not in use the only parts necessarily disassembled are the tube 1, guide plate 2 and washer 3, and for each extractor there may be provided a number of each of these parts of different sizes or thicknesses, to facilitate the adjustment and operation of the machine. A tooth having been selected for extraction, the extractor proper comprising the already assembled extractor proper comprising the threaded shank with the nut secured down thereon to approximately its inner operative position, the jaws attached to the shank, and the ring 13 in position on the jaws, is placed in position with the jaws on opposite sides of the tooth. The ring 13 is now forced down on the jaws causing them to tightly clamp the tooth. The tube 1, being a piece of ordinary tubing, cylindrical in form open at both ends and free from obstructions, is now placed over the extractor proper with its forward end resting on the crushing roll from which the tooth is to be extracted and with the threaded shank 6, with the nut 14 thereon, projecting beyond its outer end. The guide plate 2 is now slipped over the end of the shank and the nut 14 thereon, its central opening having been made large enough to permit it to pass down over the nut 14, and is seated on the outer end of the tube 1. It is now only necessary to provide a bearing for the inner face of the nut and this is provided in the washer 3, the usual central opening of which is continued radially out to one side, forming an opening sufficiently large, and only sufficiently large, to pass over the threaded shank. This washer is now seated on the outside of the plate 2 and slipped upon the shank between the plate 2 and the nut 14, already partially adjusted to position, when, by a very slight turning of the nut, very great pulling strain is placed upon the jaws and the tooth readily extracted.

It will be observed that none of the parts are of expensive special construction. The shank requires only the bifurcation of its head, bolts with square heads being readily obtainable. The jaws are made of ordinary flat bar iron, the plate 2 and washer 3 of ordinary plate iron, and the tube of ordinary cylindrical tubing, the nut being an ordinary stock nut.

The readiness of adjustment as described, is rendered possible by making the hole in the clamping plate large enough to pass over the nut already placed on the shank the clamping plate itself larger in diameter than the tube, the tube open at both ends and free of obstructions, and opening in the washer to extend out through one side thereof so that it may be slipped laterally on the shank in the manner described.

The construction and operation of the invention will be readily understood from the foregoing and it is obvious that changes and variations may be made in the form, size and proportions of the parts, without departing from the spirit and scope of the invention as defined by the appended claim.

We claim as our invention:

In a device of the character described a threaded shank having a bifurcated head, gripping jaws pivotally mounted in the bifurcation of the head and diverging toward their ends, a ring on the jaws adapted to slide thereon, a nut on the threaded body of the shank, a section of cylindrical tubing adapted to slip over and inclose the shank, jaws and ring and to rest upon the roll from which a tooth is to be extracted, a clamping plate of a greater diameter than the tube adapted to be seated on the top thereof and having a central opening of greater diameter than the nut to enable it to be passed over the same, and a washer of greater diameter than the opening in the clamping plate, provided with a radial slot extending from the center out to one side, said slot being of a width less than the diameter of the nut and sufficiently large to pass over the shank, the said washer being adapted to be passed laterally upon the shank between the clamping plate and nut.

In testimony whereof we have hereunto set our hands in presence of two subscribing witnesses.

WILLIAM CLEMOW.
CHARLES L. HEID.
ALFRED W. SPEICHER.

Witnesses:
 MORTON A. GARDNER,
 LOUIS GRAMER.

Copies of this patent may be obtained for five cents each, by addressing the "Commissioner of Patents, Washington, D. C."